United States Patent Office 3,278,545
Patented Oct. 11, 1966

3,278,545
CERTAIN TRIAZOLE COMPOUNDS AND PROCESS FOR THEIR PREPARATION
Rolf K. Huisgen and Rudolf W. Grashey, Munich, Germany, and Ralph J. Crabtree, Raleigh, N.C., assignors to Union Carbide Corporation, a corporation of New York
No Drawing. Filed Apr. 9, 1964, Ser. No. 358,976
7 Claims. (Cl. 260—308)

The present invention relates to new chemical compounds, to insecticidal compositions containing the compounds, and to a novel process for the preparation of the compounds.

The compounds of this invention are critically substituted 1,2,4-triazoles represented by the following general formula:

(I) 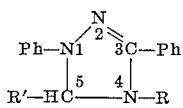

wherein Ph is phenyl; R represents lower alkyl, i.e. alkyl containing from 1 to about 8 carbon atoms, aryl, or aralkyl groups and where such groups may themselves be substituted with halogen, e.g. chlorine or bromine atoms, or nitro; and R' represents either 2-furyl or 3-furyl groups, i.e.

or

or alkoxy-substituted phenyl, i.e.

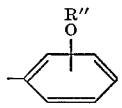

where R" is alkyl of from 1 to 4 carbon atoms and the alkoxy group, R"O—, can be attached to any one of the phenyl ring positions.

As specifically illustrative of the new compounds of Formula I, above, there can be mentioned 1,3,4-triphenyl-5-(2'-furyl)-4,5 - dihydro - 1,2,4 - triazole, hereinafter referred to as Compound 1, which is depicted as follows:

(II) 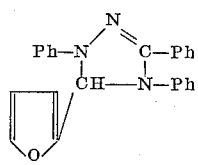

and 1,3-diphenyl-4-methyl-5-(para - methoxyphenyl)-4,5-dihydro-1,2,4-triazole, hereinafter referred to as Compound 2, whose structure is (III) 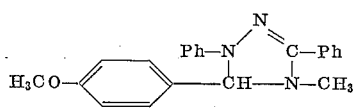

The substitutions of the 1,2,4-triazole nucleus as shown by Formula I have been found to be critical to the insecticidal effectiveness of the compounds covered thereby inasmuch as minor variations thereof will result in completely inactive compounds. For example, the following compounds were tested against various insects and found completely inactive:

4-methyl-1,3,5-triphenyl-4,5-dihydro-1,2,4-triazole
1,3,5-triphenyl-4-meta-pyridyl-4,5-dihydro-1,2,4-triazole It has been found that the greatest degree of insecticidal effectiveness is attained when R, above, is aryl, e.g. phenyl, as opposed to alkyl and aralkyl, and that, in the optimum compounds, R' is 2-furyl.

The compounds of Formula I are conveniently prepared by a novel process wherein a suitable Schiff base, (IV)        R'—CH=N—R and benzphenylhydrazide chloride, (V)        Phenyl—CCl=N—NH—Phenyl are reacted in a suitable organic solvent, e.g. benzene, toluene, chloroform, in the presence of an HCl-acceptor, e.g. a tertiary amine, at temperatures of from about 0° C. to about 80° C., preferably from 25° C. to 55° C., to produce the desired compound in excellent yields in the order of 90 percent of theory.

The following example is illustrative.

*Example.—Preparation of 1,3,4-triphenyl-5-(2'-furyl)-4,5-dihydro-1,2,4-triazole (Compound 1)*

0.01 mole (1.7 grams) of N-furfurylideneaniline (a Schiff base for which R is phenyl and R' is 2-furyl in Formula IV above) and 0.01 mole (2.30 grams) of benzphenylhydrazide were dissolved in 10 milliliters of benzene and 1.0 gram of triethylamine was added dropwise to the solution at 25° C. The resulting reaction mixture was allowed to stand at room temperature for 24 hours. After this period, the resulting triethylamine hydrochloride was filtered out and the remaining reaction mixture was washed with water to remove the last traces of the hydrochloride. The reaction mixture was then distilled under reduced pressure (to 25° C. at 2 mm. Hg) to remove the benzene solvent and the residue product was recrystallized from ethanol to give the title compound in 90 percent yield. 1,3,4-triphenyl-5-(2'-furyl)-4,5-dihydro-1,2,4-triazole is a light tan solid having a melting point of 114.5–115.5° C. Its structure was confirmed by chemical analysis.

Compound 2 is prepared analogously by using para-methoxybenzylidenemethylamine as the Schiff base. The Schiff bases themselves are known and readily prepared from the corresponding aldehydes and aliphatic or aromatic amines.

The insecticidal effectiveness of the novel compounds is remarkable both in its intensity and specificity, as evidenced by the following tests in which Compounds 1 and 2 were used.

Both compounds were formulated by dissolving one gram of compound in 50 milliliters of acetone in which had been dissolved 0.1 gram (10 percent of the weight of the compound) of an alkylphenoxy polyethoxyethanol surfactant, as an emulsifying or dispersing agent. The resulting solution was mixed into 200 milliliters of water to give 250 milliliters of a suspension containing the compound in finely divided form. The thus-prepared stock suspension contained 0.4 percent by weight of compound. The test concentrations employed in the tests described hereinbelow were obtained by diluting the stock suspension with water.

In one series of tests, the compounds were tested against the Mexican bean beetle: Third instar larvae of the Mexican bean beetle (*Epilachna varivestis,* Muls.), reared on Tendergreen bean plants at a temperature of 80±5° F. and 50±5 percent relative humidity, were the test inserts. Initially, the stock suspension was diluted with water to give a test solution containing 1000 parts of test compound per million parts of final formulation by weight. Paired seed leaves excised from Tendergreen bean plants were dipped in the test solution until thoroughly wetted, excess liquid being removed by gentle shaking. While the leaves were drying under a hood, wilting was prevented by placing the stems in water. When dry, the paired leaves were separated and each was placed in a 9-centimeter Petri dish lined with filter paper. Four randomly selected larvae were introduced into each dish, and the dishes were closed. The closed dishes were labeled and held at a temperature of 80±5° F. for three days. Although the larvae could easily consume the leaf within 24 to 48 hours, no more food was added. Larvae which were unable to move the length of the body, even upon stimulation, were considered dead. The test was repeated with increasingly dilute solutions of test compound to determine the concentration of compound required to kill fifty percent of the beetle population. This concentration (designated as $LD_{50}$) was found to be 1 part of compound per million parts of applied solution for Compound 1 and 15 parts per million for Compound 2.

In another series of tests, Compound 1 and 2 were tested against the southern armyworm. Larvae of the southern armyworm (*Prodenis eridania*, Cram.), reared on Tendergreen bean plants at a temperature of 80±5° F. and a relative humidity of 50±5 percent, constituted the test insects. The test larvae were removed from the colony and held without food for four hours prior to the test. Initially, the stock suspension was diluted with water to give a test solution containing 1000 parts of test compound per million parts of final formulation by weight. Paired seed leaves, excised from Tendergreen bean plants, were dipped in the test formulation until thoroughly wetted, excess liquid being removed by gentle shaking. While the leaves were drying in a ventilated hood, wilting was prevented by placing the stems in water. When dry, the paired leaves were separated and each one was placed in a 9-centimeter Petri dish lined with filter paper. Four randomly selected larvae were introduced into each dish and the dishes were closed. The closed dishes were labeled and held at 80–85° F. for three days. Although the larvae could easily consume the whole leaf within twenty-four hours, no more food was added. Larvae which were unable to move the length of the body, even upon stimulation by prodding, were considered dead. The test was repeated with increasingly dilute solutions of test compound to determine the concentration of compound required to kill fifty percent of the armyworm population. This concentration (designated as $LD_{50}$) was found to be 400 parts of compound per million parts of applied solution for Compound 1 and 800 parts per million for Compound 2.

The compounds contemplated herein are exceptionally effective against insects of the order Coleoptera, which are illustrated by the Mexican bean beetle, the boll weevil, the Japanese beetle, the corn rootworm, the wireworm, the alfalfa beetle, and the Colorado potato beetle.

When used as insecticides, the compounds of this invention are usually applied to the plants to be protected, to kill the insects already infesting the plant or to prevent infestation. Generally, in such application, the compounds of this invention are used in admixture with an inert carrier. This carrier may be a liquid, to form sprays, or a solid, to form dusts. Liquid sprays may be readily prepared by dissolving one of the compounds of this invention in a water-soluble solvent, such as acetone, and mixing the resulting solution into a larger volume of water, thereby throwing the insecticide out of solution in a finely divided, substantially colloidal condition. Liquid sprays may also be prepared by dissolving one of the compounds of this invention in an organic solvent, such as acetone, toluene, xylene, kerosene, or mixtures thereof and dispersing the dissolved insecticide in water by utilizing a suitable surface active dispersing agent such as condensation products of alkylene oxides and organic acids, proprietary non-ionic alkyl phenyl polyethylene glycol ethers, alkyl aryl sulfonates, or quaternary ammonium compounds. Generally, the concentration of the dispersing agent is from 0.1% to 10% by weight of the toxicant. The preferred concentration of active toxicant will usually not exceed 10% by weight of final spray. In the preparation of dusts or wettable powders, the active insecticide compound in finely divided form or a solution of the insecticide in a volatile solvent may be mixed into an inert particulate extender, such as clay, talc, chalk, bentonite, fuller's earth and the like. The volatilization of the solvent deposits the inserticide in and on the extender in finely divided form. When formulating a wettable powder, one or more of the above-mentioned dispersing agents may be added and, if desirable, a wetting agent such as a formulation of sodium heptadecyl sulfate, may also be included. The combined amount of dispersing and wetting agents may vary broadly, it is usually from about 0.5% to about 15% by weight of the final dust or powder.

What is claimed is:

1. Substituted triazole of the formula

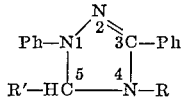

wherein pH is phenyl; R is selected from the group consisting of alkyl groups of from 1 to 8 carbon atoms, aryl groups and aralkyl groups of not more than 10 carbon atoms, such groups being optionally substituted with halo and nitro; and R' is selected from the group consisting of 2-furyl, 3-furyl, and alkoxy-substituted phenyl where the alkoxy group contains from 1 to 4 carbon atoms.

2. 1,3,4-triphenyl - 5 - (2'-furyl)-4,5-dihydro-1,2,4-triazole.

3. 1,3 - diphenyl - 4 - methyl-5-(para-methoxyphenyl)-4,5-dihydro-1,2,4-triazole.

4. Process for preparing a substituted triazole of the formula

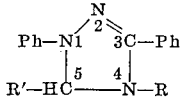

which comprises reacting a Schiff base of the formula

with benzphenylhydrazide chloride,

in the presence of a hydrogen chloride acceptor.

5. Process of claim 4 wherein the reaction temperature is from 25° C. to 55° C.

6. Process for preparing 1,3,4-triphenyl-5-(2'-furyl)-4,5-dihydro 1,2,4-triazole which comprises reacting N-furfurylidene-aniline with benzphenylhydrazide chloride chloride in the presence of a hydrogen chloride acceptor.

7. Process for preparing 1,3-diphenyl-4-methyl-5-(para-methoxyphenyl)-4,5-dihydro-1,2,4-triazole which comprises reacting para-methoxybenzylidenemethylamine with benzphenylhydrazide chloride in the presence of a hydrogen chloride acceptor.

References Cited by the Examiner
UNITED STATES PATENTS

| | | | |
|---|---|---|---|
| 1,825,549 | 9/1931 | Scheuing et al. | 260—308 |
| 2,884,424 | 4/1959 | Klingsberg | 260—308 |
| 2,976,207 | 3/1961 | Little et al. | 167—33 |
| 3,169,904 | 3/1965 | Calderbank et al. | 167—33 |

ALEX MAZEL, *Primary Examiner.*

HENRY R. JILES, NICHOLAS S. RIZZO, ALTON D. ROLLINS, *Assistant Examiners.*